United States Patent
Sundaresan et al.

(10) Patent No.: US 9,619,515 B2
(45) Date of Patent: *Apr. 11, 2017

(54) SEARCH BASED ON DIVERSITY

(71) Applicant: eBay Inc., San Jose, CA (US)

(72) Inventors: Neelakantan Sundaresan, Mountain View, CA (US); Nishith Parikh, Fremont, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/865,279

(22) Filed: Sep. 25, 2015

(65) Prior Publication Data

US 2016/0012109 A1  Jan. 14, 2016

Related U.S. Application Data

(63) Continuation of application No. 12/263,396, filed on Oct. 31, 2008, now Pat. No. 9,152,699.

(60) Provisional application No. 60/985,105, filed on Nov. 2, 2007.

(51) Int. Cl.
  *G06F 17/30* (2006.01)

(52) U.S. Cl.
  CPC .. *G06F 17/30448* (2013.01); *G06F 17/30321* (2013.01); *G06F 17/30672* (2013.01)

(58) Field of Classification Search
  USPC ................................................ 707/706, 711
  See application file for complete search history.

(56) References Cited

U.S. PATENT DOCUMENTS

| | | | |
|---|---|---|---|
| 6,169,986 B1 * | 1/2001 | Bowman | G06F 17/30395 |
| 7,146,356 B2 * | 12/2006 | Choi | G06F 17/3043 |
| | | | 707/706 |
| 7,236,969 B1 * | 6/2007 | Skillen | G06F 17/30864 |
| | | | 707/706 |
| 9,152,699 B2 | 10/2015 | Sundaresan et al. | |
| 2007/0185859 A1 * | 8/2007 | Flowers | G06F 17/30864 |
| 2007/0192309 A1 * | 8/2007 | Fischer | G06F 17/30684 |
| 2007/0192319 A1 * | 8/2007 | Finley | G06F 17/30867 |
| 2007/0208730 A1 * | 9/2007 | Agichtein | G06F 17/30867 |
| 2007/0214131 A1 * | 9/2007 | Cucerzan | G06F 17/30864 |
| 2008/0235209 A1 * | 9/2008 | Rathod | G06F 17/30864 |
| 2009/0119248 A1 | 5/2009 | Sundaresan et al. | |
| 2010/0228715 A1 * | 9/2010 | Lawrence | G06F 17/30867 |
| | | | 707/706 |

OTHER PUBLICATIONS

"U.S. Appl. No. 12/263,396, Appeal Decision mailed Mar. 26, 2015", 7 pgs.

(Continued)

*Primary Examiner* — Kim Nguyen
(74) *Attorney, Agent, or Firm* — Schwegman, Lundberg & Woessner, P.A.

(57) ABSTRACT

Systems and a method for expanding a query are described. The method calculates a diversity index for a plurality of query terms that are included in a plurality of other queries associated with the query. The diversity index is a measure of diversity among the plurality of query terms and relates to differences among the plurality of query terms. The method further compares the diversity index to a threshold value. Finally, the method expands the query with one or more of the plurality of query terms based on the comparison.

20 Claims, 9 Drawing Sheets

(56) References Cited

OTHER PUBLICATIONS

"U.S. Appl. No. 12/263,396, Decision on Pre-Appeal Brief mailed Mar. 28, 2012", 2 pgs.
"U.S. Appl. No. 12/263,396, Examiner's Answer mailed Aug. 20, 2012", 12 pgs.
"U.S. Appl. No. 12/263,396, Final Office Action mailed May 26, 2011", 13 pgs.
"U.S. Appl. No. 12/263,396, Non Final Office Action mailed Sep. 14, 2011", 13 pgs.
"U.S. Appl. No. 12/263,396, Non Final Office Action mailed Dec. 9, 2010", 13 pgs.
"U.S. Appl. No. 12/263,396, Notice of Allowance mailed Jun. 4, 2015", 9 pgs.
"U.S. Appl. No. 12/263,396, Pre-Appeal Brief Request filed Jan. 16, 2012", 5 pgs.
"U.S. Appl. No. 12/263,396, Response filed Mar. 7, 2011 to Non Final Office Action mailed Dec. 9, 2010", 7 pgs.
"U.S. Appl. No. 12/263,396, Response Filed Mar. 7, 2011 to Non-Final Office Action mailed Dec. 9, 2010", 7 pgs.
"U.S. Appl. No. 12/263,396, Response filed Aug. 25, 2011 to Final Office Action mailed May 26, 2011", 8 pgs.
"Applied Geography 22", (2002), 175-186.

\* cited by examiner

List of Example Queries Related to Coins american coins
ancient coins
bullion coins
canada candadian coins
challenge chinese coin coins
dollar dollars eagle coin
coins german gold
greek coins
liberty lot mexican mint coins
age of old proof coins quarters
rare roman sets silver coins

QUERY: "CLUB" — 702

| CATEGORY | TITLE |
|---|---|
| GOLF | GOLF GROOVE SHARPENER |
| GOLF | HYBRID GOLF CLUBS |
| TICKETS | FREE CLUB PASSES - VEGAS |
| FURNITURE | CHARTER CLUB - PILLOWSHAM |
| COUPONS | ESPRESSO CLUB CARD COUPONS |
| MOVIES | FIGHT CLUB |

SEARCH BASED ON DIVERSITY

CROSS-REFERENCE TO RELATED APPLICATIONS

This application is a continuation application which claims the priority benefit of U.S. patent application Ser. No. 12/263,396, filed Oct. 31, 2008, which claims the priority benefit of U.S. Provisional Application No. 60/985,105, entitled "DATA MODELING BASED ON QUERY TERMINOLOGY," filed Nov. 2, 2007, all of which are hereby incorporated by reference in their entirety.

FILED

The present disclosure relates generally to information retrieval. In an example embodiment, the disclosure relates to a search based on diversity.

BACKGROUND

Information retrieval relates to the searching of information stored on computing systems, such as searches for web pages, items for sale, documents, and images. To locate particular information, a user specifies a query about the information of interest and a search engine, for example, uses this query in the search. For example, online shopping and auction websites provide a number of publishing, listing, and price-setting mechanisms whereby a seller may list (or publish information concerning) items for sale. A buyer can express interest in or indicate a desire to purchase such items by, for example, submitting a query to the website for use in a search of the requested items.

The accurate matching of a query to relevant items is currently a major technical challenge in the field of information retrieval. An example of such a challenge is that item descriptions (e.g., title) tend to be short and such descriptions may be uniquely defined by the sellers. The buyers seeking to purchase the items might use a different vocabulary from the vocabulary used by the sellers to describe the items. As an example, an item identified in the title as a "garnet" does not match a query "January birthstone" submitted by a buyer, although garnet is known as the birthstone for January. In another example, an item identified in the title as "Martin guitar" does not match the query "acoustic guitar" submitted by a buyer, although the Martin guitar is a type of an acoustic guitar. As a result, for example, online shopping and auction websites that use a conventional search engine to locate items may not effectively connect the buyers to the sellers.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Figure 1:
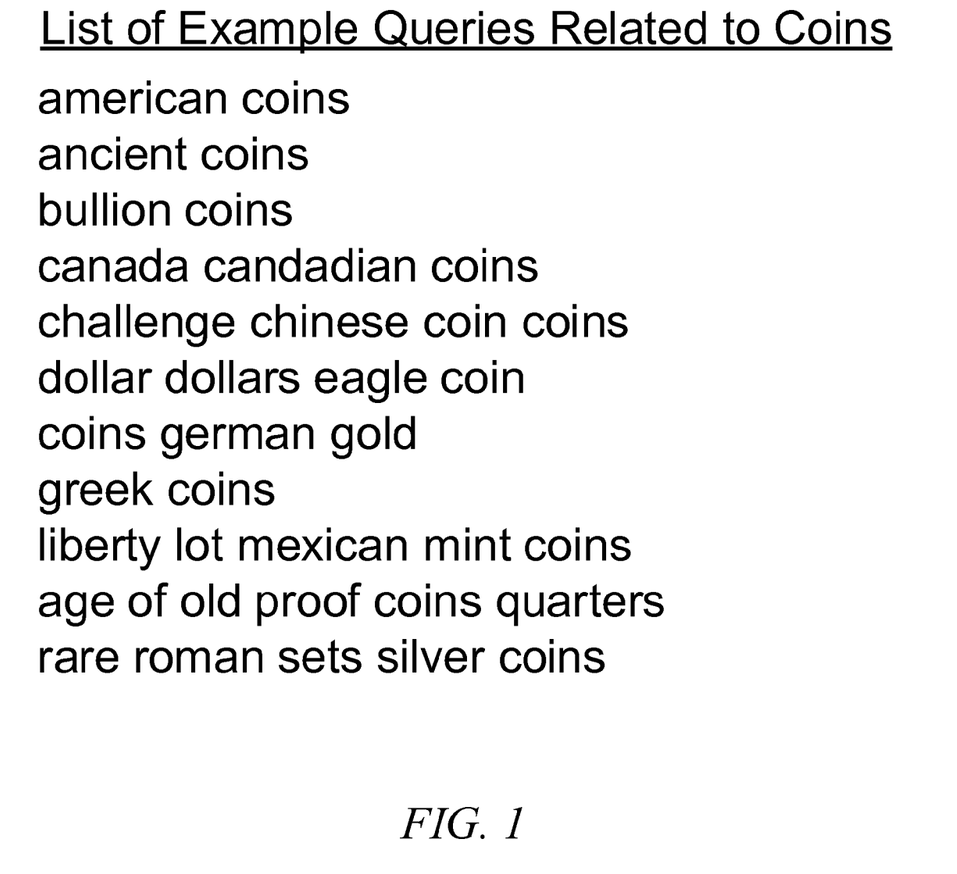
FIG. 1 depicts a diagram of a list of example queries that may be used to expand a search, in accordance with an illustrative embodiment.

FIG. 1 depicts a diagram of a list of example queries that may be used to expand a search, in accordance with an illustrative embodiment. In general, a "query," as used herein, is an enquiry about one or more items, which refer any tangible or intangible thing and/or something that has a distinct, separate existence from other things (e.g., goods, services, electronic files, web pages, electronic documents, and land). The terms included in the query (or query terms) may include words, numbers, symbols, and other alphanumeric characters. For example, a user may input or submit a query to an online shopping or auction website to locate, purchase, or bid on one or more products. In another example, a query may be used in a search to locate a particular web page.

FIG. 1 depicts a list of example queries submitted within a particular time period that are related to "coins." As listed, these example queries include query terms such as "American coins," "ancient coins," "bouillon coins," "Canada Canadian coins," "challenge Chinese coin coins," "dollar dollars Eagle coin," "coins German gold," "Greek coins," "liberty lot Mexican mint coins," "age of old proof coins quarters," and "rare Roman sets silver coins." All these queries relate to "coins" because they all share a common term "coin" or "coins." As described in more detail below, these query terms may be used to expand a search of coins sold, for example, at an online shopping website.

The decision of whether to expand a search depends on a diversity of data related to the search. The diversity relates to the difference or unlikeness between two or more objects and, in an illustrative embodiment, the decision to expand a search may be based on the diversity between queries. For example, a set of queries comprising only "coin" query terms is not diverse because all the query terms "coin" are identical. On the other hand, the query terms listed in FIG. 1 are diverse because most of the query terms are different. In another embodiment, the decision to expand a search may be based on the diversity of a result set resulting from a search, which is explained in more detail below.

Figure 2:
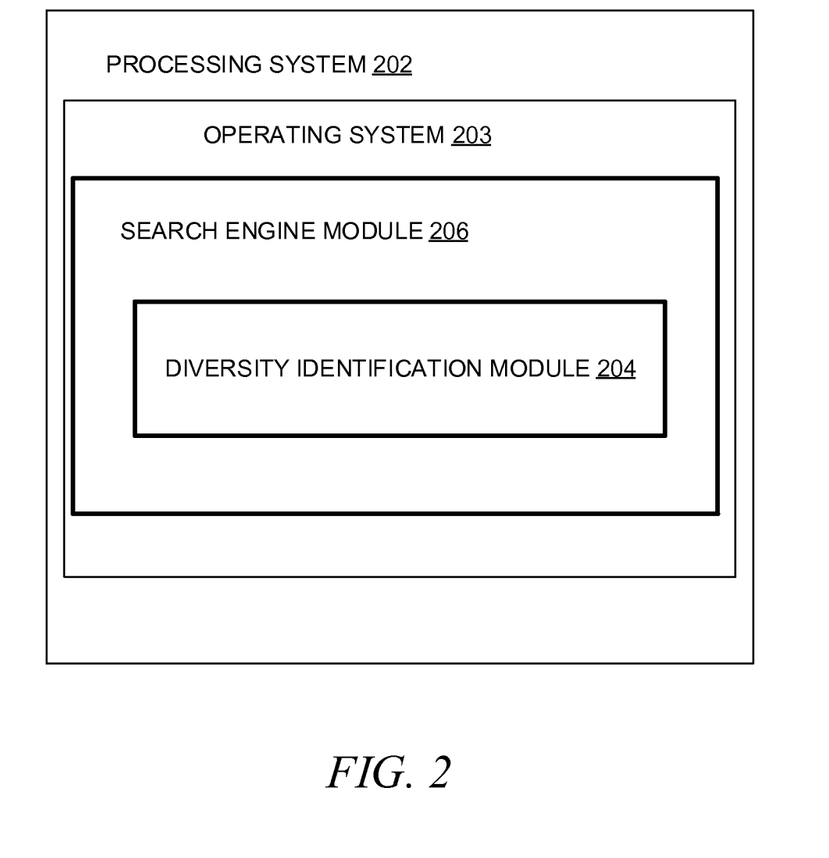
FIG. 2 depicts a block diagram of a search engine module, in accordance with an illustrative embodiment, included in a processing system that is configured to expand a search.

FIG. 2 depicts a block diagram of a search engine module 206, in accordance with an illustrative embodiment, included in a processing system 202 that is configured to expand a search. It should be appreciated that the processing system 202 may be deployed in the form of a variety of computing devices, such as personal computers, laptop computers, and server computers. In various embodiments, the processing system 202 may be used to implement computer programs, logic, applications, methods, processes, or other software to expand a search, as described in more detail below.

The processing system 202 hosts an operating system 203 that manages the software processes and/or services executing on the processing system 202. As depicted in FIG. 2, these software processes and/or services may include a search engine module 206 with a diversity identification module 204. The search engine module 206 is an information retrieval system configured to search for a variety of information stored on computer systems. Examples of the search engine module 206 include a video search engine, a web search engine, a metadata search engine, a desktop search engine, and a product search engine. This diversity identification module 204 included within the search engine module 206 is configured to measure a diversity of data related to a search. In an embodiment, as explained in more detail below, the diversity identification module 204 may measure the diversity of query terms. In another embodiment, as also explained in more detail below, the diversity identification module 204 may also measure the diversity of a result set resulting from a search. The search engine module 206 then uses this measured diversity to expand a search by, for example, providing suggestions of expanded queries with related query terms, which is explained in more detail below.

It should be appreciated that in other embodiments, the processing system 202 may include fewer, more, or different modules apart from those shown in FIG. 2. For example, in another embodiment, the search engine module 206 may be separate from the diversity identification module 204. The modifications or additions to the structures described in relation to FIG. 2 to implement these alternative or additional functionalities will be implementable by those skilled in the art, having the benefit of the present specification and teachings.

Figure 3:
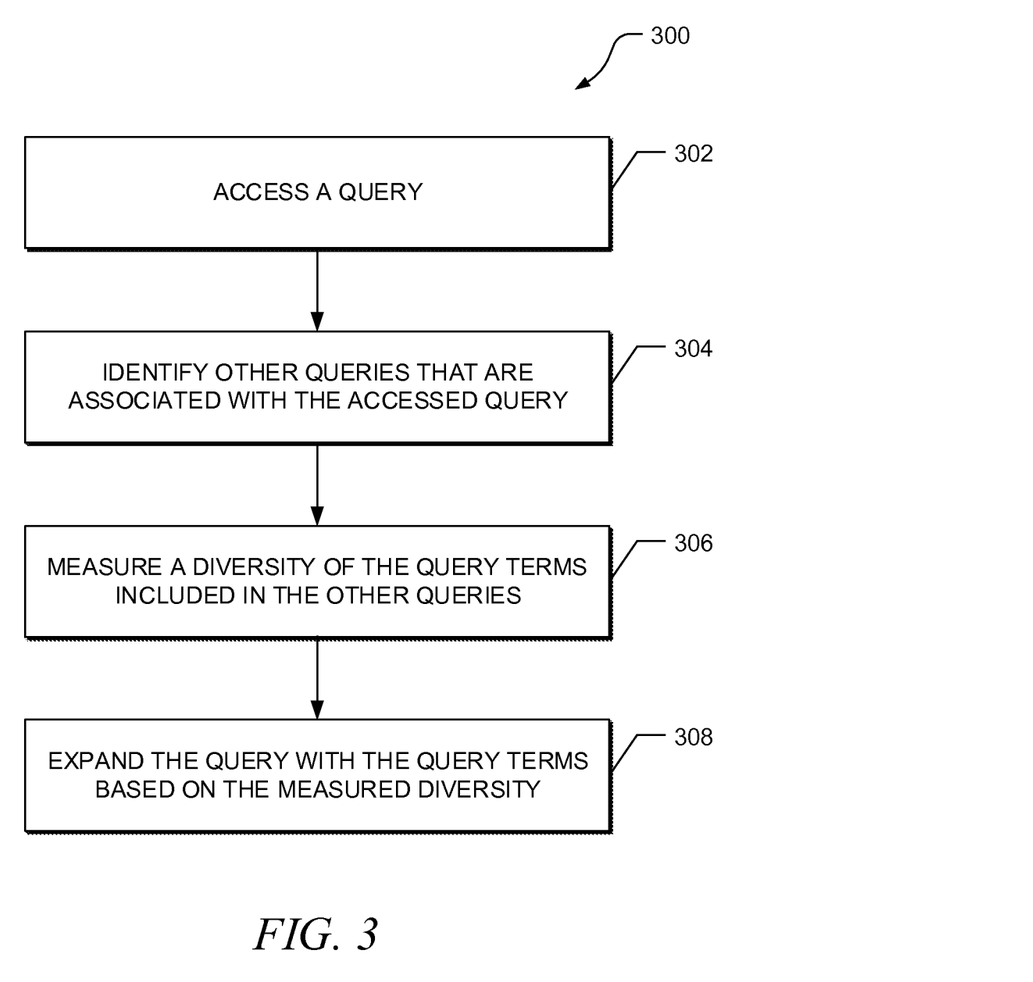
FIG. 3 depicts a flow diagram of a general overview of a method, in accordance with an illustrative embodiment, for expanding a search.

FIG. 3 depicts a flow diagram of a general overview of a method 300, in accordance with an illustrative embodiment, for expanding a search. In an embodiment, the method 300 may be implemented by the search engine module 206 of FIG. 2 and employed in the processing system 202. As depicted in FIG. 3, a query used in a search is accessed at 302 and other previously submitted queries that are associated with the accessed query are identified at 304. These other previously submitted queries may be associated with the accessed query based on a variety of relationships. For example, as explained in more detail below, the queries may be related based on the identification of a common query term between the queries.

It should be noted that these other previously submitted queries are submitted by other users, but they also may be previously submitted by the same user that submitted the accessed query from 302 as well. In addition to identifying relationships between the queries, these other previously submitted queries may also be identified based on a variety of other criteria. An example of such a criterion is identifying only associated queries that are submitted within a particular time period.

These other previously submitted queries include query terms and a diversity of these query terms is measured at 306. In an illustrative embodiment, the diversity of the query terms may be measured by calculating a diversity index. A diversity index is a statistic that is normally used to measure a biodiversity of an ecosystem. However, the diversity index may be additionally applied to measure the diversity of query terms or other data associated with a search, in accordance with embodiments of the present invention. For example, the diversity index may be embodied as a Simpson's diversity index "D" expressed as:

$$D = \frac{\sum_{i=1}^{S} n_i(n_i - 1)}{N(N - 1)}$$

where S is the number of species, N is the total percentage cover or total number of organisms, and n is the percentage cover of a species or number of organisms of a species. Here, the number of species S, total percentage cover N, or the percentage cover of a species n may be substituted with a variety of suitable data associated with a search. For example, the total percentage cover N may be substituted with a total number of query terms and the percentage cover of a species n may be substituted with each of the query terms.

In addition, the diversity index may be embodied as Shannon index "H" expressed as:

$$H' = -\sum_{i=1}^{S} p_i \ln p_i$$

where S is the number of species and $p_i$ is the relative abundance of each species defined as $n_i/N$, where N is the total number of all individuals and $n_i$ is the number of individuals in a species. Similarly, the number of species S and the relative abundance of each species $p_i$ may be substituted with a variety of suitable data associated with a search. For example, the number of species S may be substituted with a total number of query terms and the number of individuals in a species $n_i$ may be substituted with each of the query terms.

The search may then be expanded based on the measured diversity. In an embodiment, the search may be expanded by expanding the query with the other previously submitted query terms at 308. For example, previous submitted queries related to videogames include query terms "role-playing," "action," "simulation," and "sports" can be added to or combined with a query "fun videogames" to create a new, expanded query "role-playing action simulation sports fun videogames." As explained in more detail below, the decision of whether to expand the search is based on the measured diversity.

Figure 4:
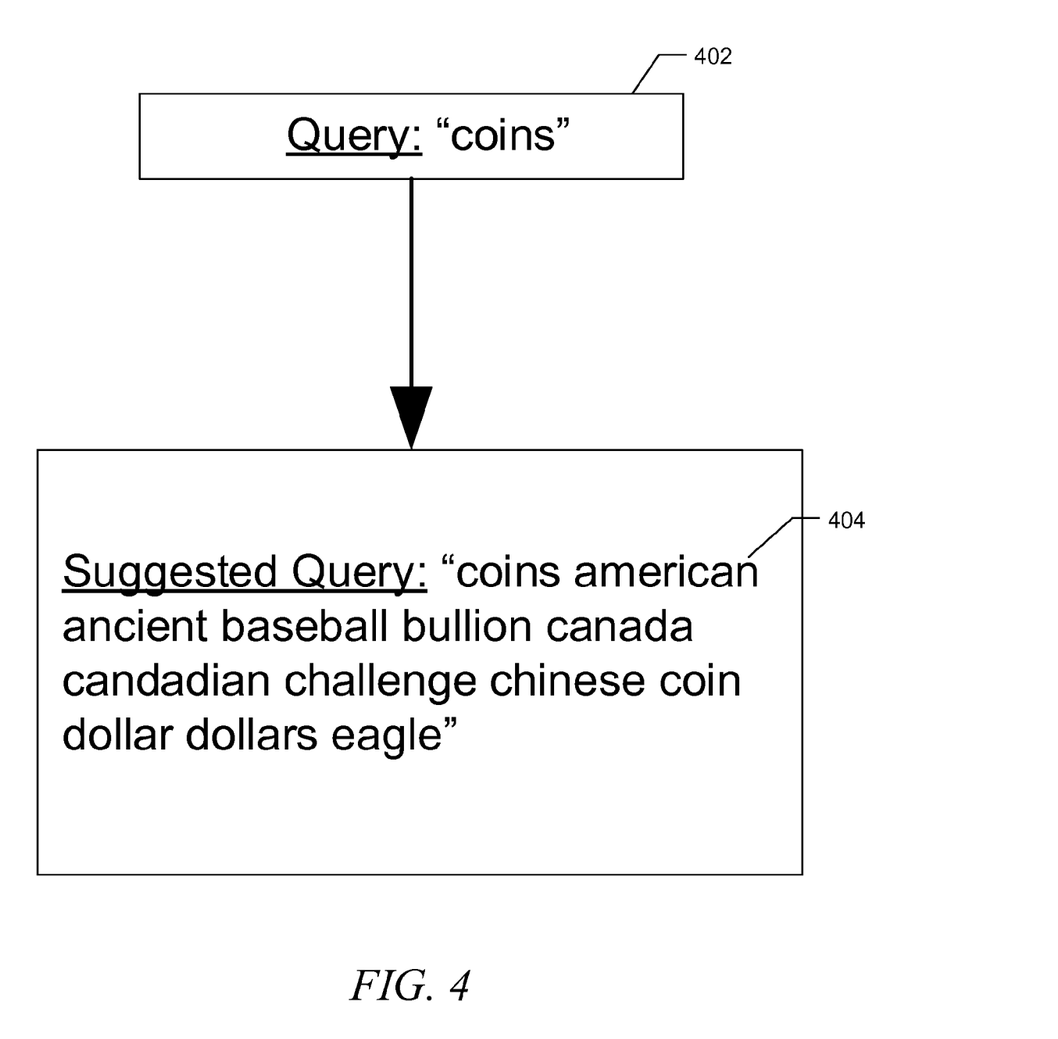
FIG. 4 depicts a diagram of example queries that may be used, in accordance with an illustrative embodiment, to expand a search.

FIG. 4 depicts a diagram of example queries that may be used, in accordance with an illustrative embodiment, to expand a search. As depicted, a user submits a query "coins" 402 to, for example, an auction website to search for auctioned coins. A search engine module associated with the auction website accesses the query 402 and, instead of directly searching for items based on the query 402, the search engine module may expand the search based on other previously submitted queries.

In this example, the search engine module identifies other previously submitted queries that are associated with the query 402. Here, the identification may, for example, include identifying previously submitted queries within a particular time period and then further identifying a portion of the those queries based on relationships between those queries. For example, the search engine module may identify related or associated queries by searching for the inclusion of common query terms, such as "coins" or "coin," which is described in more detail below. As depicted in FIG. 4, these identified queries include query terms 404 such as "coins," "American," "ancient," "baseball," "bullion," "Canada," "Canadian," "challenge," "Chinese," "coin," "dollar," "dollars," and "eagle."

Once the associated queries are identified, the search engine module then measures a diversity of the query terms included in these queries using, for example as discussed earlier, Simpson's diversity index or Shannon's index. In this example, a diversity between the query terms 404 is measured to be sufficiently diverse because of the variety of different query terms 404, such as "ancient," "challenge," and "Chinese." As explained in more detail below, the identification of whether a measurement is sufficiently diverse is based on a comparison of the computed index, for example, with a threshold value. However, if all the query terms are only "coins," then the query terms 404 may not be sufficiently diverse for use to expand the search.

Based on the query terms 404 being sufficiently diverse, the query 402 may be expanded by, for example, providing the query terms 404 to the user as a suggested alternative for use in the search for "coins." For example, as depicted in FIG. 4, the suggested query terms 404 may be displayed to the user as an alternative query upon the user submitting the query 402. If the user selects these query terms 404, then the search engine module bases the search on the query terms 404 rather than the query 402. As a result, the query 402 is expanded with the query terms 404 to increase diversity of the query terms, which results in an expanded scope of the search for "coins," and thereby provides a higher probability when compared to the original query 402 of locating the coins needed by the user.

Figure 5:
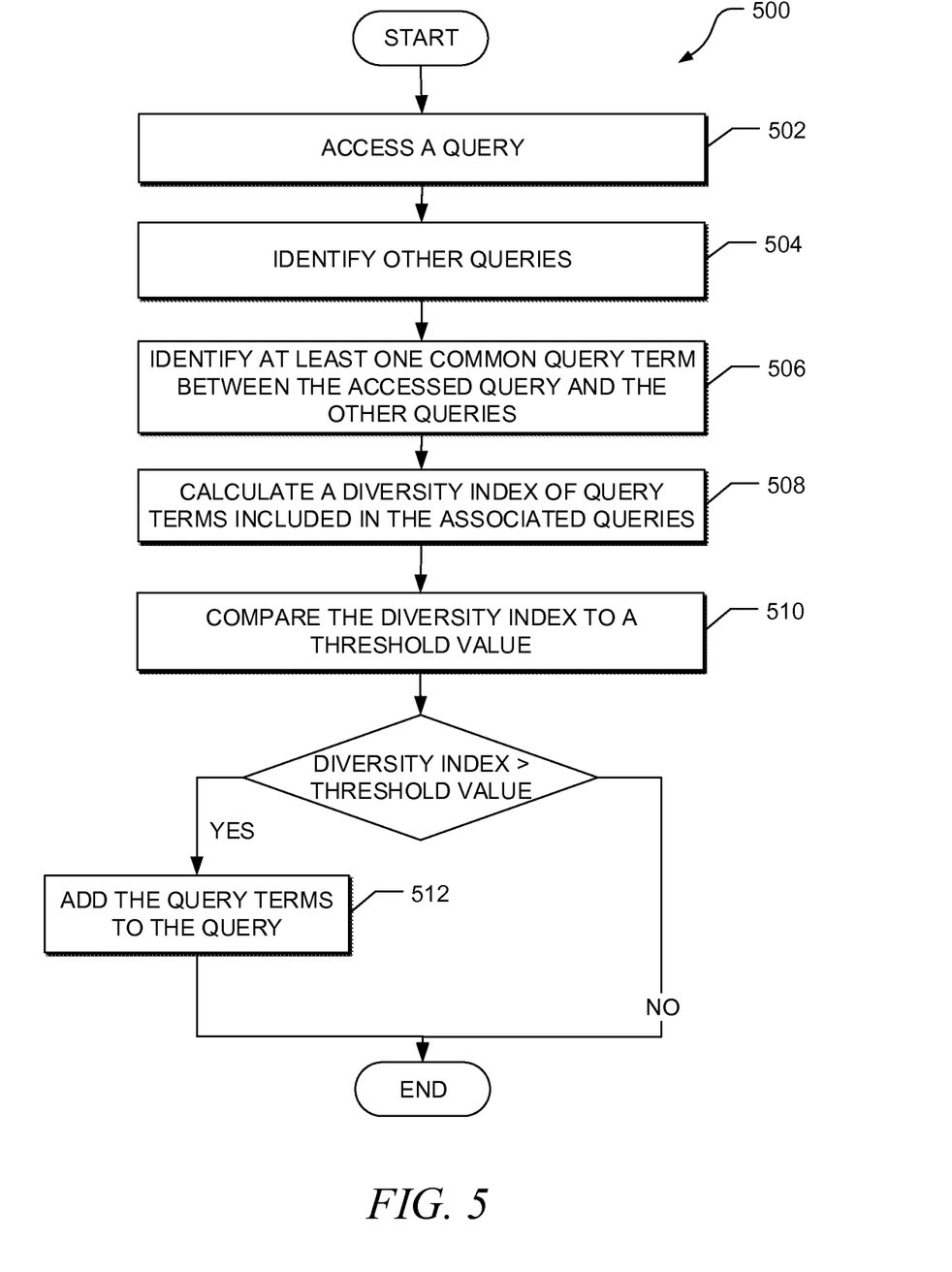
FIG. 5 depicts a flow diagram of a detailed method, in accordance with an illustrative embodiment, of expanding a search.

FIG. 5 depicts a flow diagram of a detailed method 500, in accordance with an illustrative embodiment, of expanding a search. As depicted, a query submitted in a search is accessed at 502 and other previously submitted queries that are associated with the accessed query are identified at 504. The queries are comprised of one or more query terms and, in this example, the other previously submitted queries are located by identifying at least one common query term between the accessed query and the other previously submitted queries at 506. As used herein, a "common term" is a term included in a query that is similar to another term defined in at least one other query. In an example embodiment, the identification of the common term is based on a textual similarity match. A textual similarity match is based on matching characters (e.g., alphanumeric characters) of a portion or a complete query term. As an example, the queries "automobile" and "red automobile" share a common term "automobile." The query terms do not have to be identical for a textual similarity match. For example, different forms of a query term (e.g., plural, singular, and gerund) may be identified as equivalent to the query term. As an example, the queries "red apple" and "green apples" share a common term "apple" if the common term is defined as to include plural forms of nouns.

The diversity of the other previously submitted queries is then measured by, for example, calculating a diversity index of the query terms at 508. This calculated diversity index is then compared to a threshold value at 510, which may be a predefined value defining a minimum level of diversity. If the diversity index is less than the threshold value, then the other previously submitted query terms are not sufficiently diverse and therefore, are not used to expand the search. On the other hand, if the diversity index is greater than the threshold value, then these other previously submitted query terms are sufficiently diverse and may be used to expand the search. In an example embodiment, the search may be expanded by adding these previously submitted query terms to the query at 512, which is discussed above. In an alternate embodiment, the search may be expanded by submitting these other previously submitted query terms instead of the original query terms for the search. For example, previous submitted queries related to "sofas" include query terms "furniture" and "couch." Instead of using the original query "sofas" for the search, the query "furniture couch" may replace the original query "sofas" and be used in the search.

Figure 6:
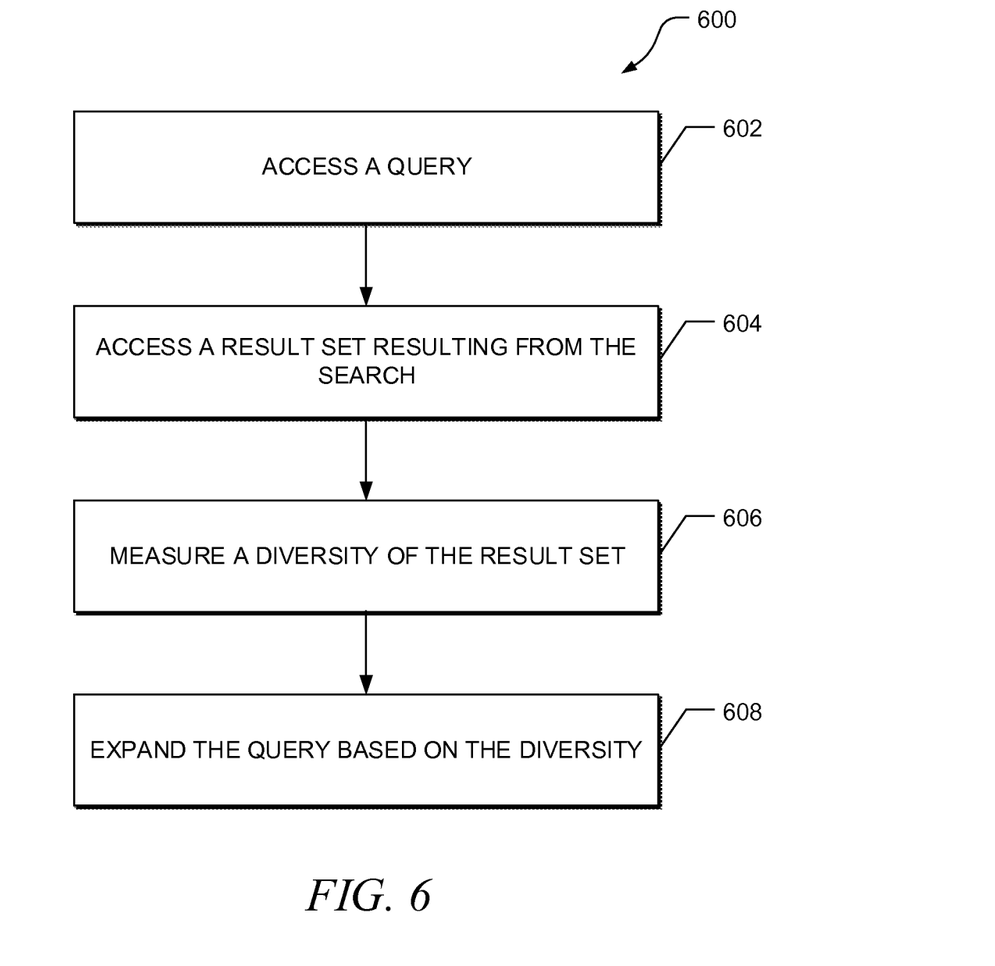
FIG. 6 depicts a flow diagram of a general overview of the method, in accordance with an illustrative embodiment, for expanding a search based on results from the search.

FIG. 6 depicts a flow diagram of a general overview of a method 600, in accordance with an illustrative embodiment, for expanding a search based on results from the search. In an example embodiment, the method 600 may be implemented by the search engine module 206 of FIG. 2 and employed in the processing system 202. As depicted in FIG. 6, a user submits a query for a search and this query is accessed at 602. The search engine module then searches for information based on the submitted query and provides a result set. As used herein, a "result set" refers to an output of information resulting from a search based on a query. The result set may include a variety of information, such as a list of items (e.g., web site listings, product listings, image listings, document listings, and real estate listings), images, text, information (e.g., advertisements, links, and widgets) included in a web page, and any other suitable information that satisfies the query.

The result set is also accessed at 604 and a diversity of the result set is measured at 606. In an illustrative embodiment, the measurement may be made by calculating a diversity index, which is described above. This measurement is made in order to identify whether the results of the search are sufficiently diverse. As illustrated in more detail below, it should be noted that the diversity measurement may be made of the complete result set or a portion of the result set. The search may then be expanded based on the measured diversity at 608. For example, as explained in more detail below, if the result set is not sufficiently diverse, then the search is expanded. On the other hand, if the result set is sufficiently diverse, then the search is not expanded.

Figure 7:
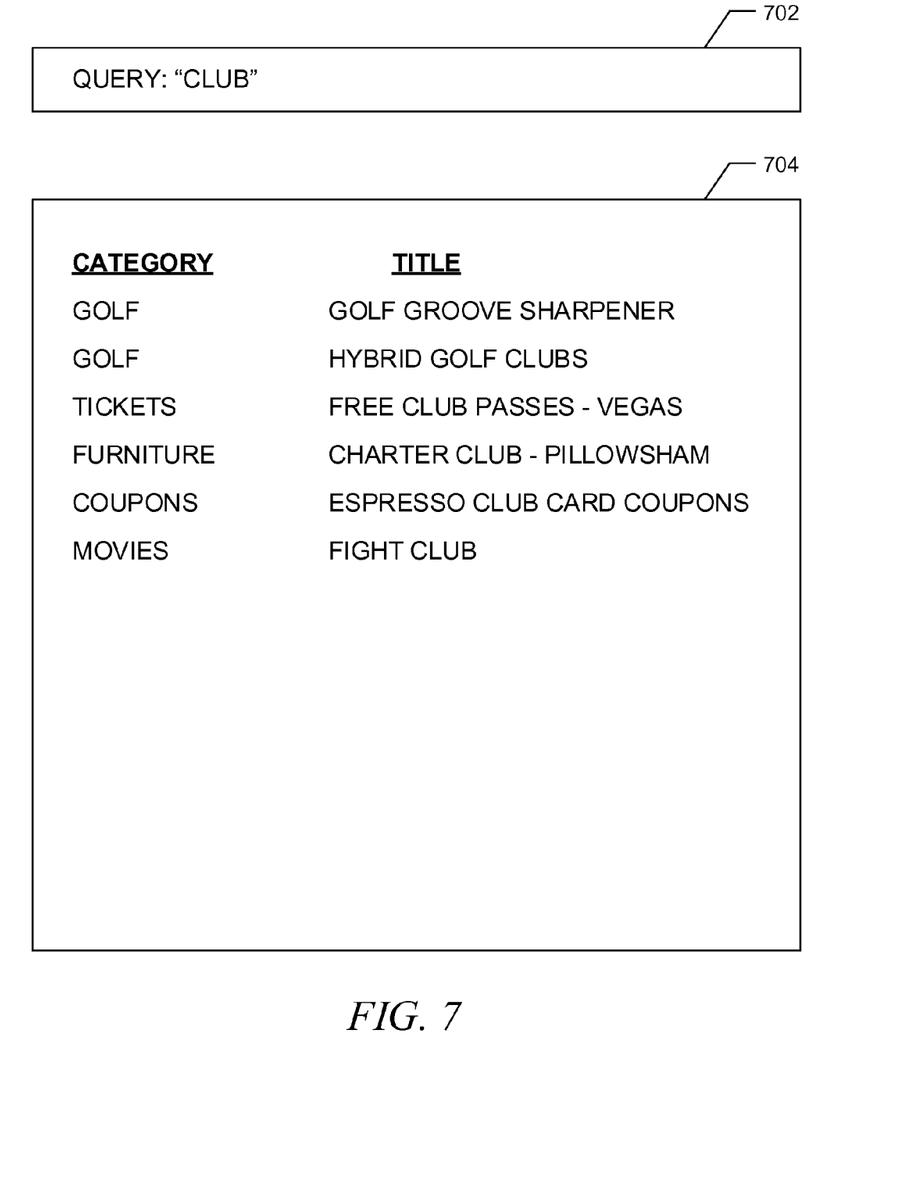
FIG. 7 depicts a diagram illustrating a diversity of an example result set, in accordance with an illustrative embodiment.

FIG. 7 depicts a diagram illustrating a diversity of an example result set, in accordance with an illustrative embodiment. In this example, a user submits a query with the query term "club" 702 to, for example, an online shopping website that sells products over the Internet. The search engine module associated with this example website then conducts a search of inventory and provides a result set 704 that lists products that satisfy the query 702. The result set includes a list of products identified by their title and category, with titles such as golf group sharpeners, golf clubs, and pillow shams that are assigned to various categories, such as golf, tickets, and coupons.

The search engine module accesses this result set 704 and measures its diversity. The diversity may be based on any portion of information included in the result set. For example, in an embodiment, the diversity of one or more attributes of an item (e.g., a product) listed in the result set may be measured. An "attribute," as used herein, refers to a property belonging to an item, which, for example, may be defined in a description associated with the item. Examples of attributes include size, title, shape, color, construction material, country of manufacture, brand name, category assigned to the item, serial number, and other attributes.

As depicted in FIG. 7, in an embodiment, a diversity of the categories (e.g., golf, tickets, and furniture) assigned to the products may be measured. In an alternate embodiment, a diversity of the titles (e.g., "Fight Club" and "Free Club Passes—Vegas") assigned to the products may also be measured. Other example attributes that may be measured for diversity include shipping company, price, size, and color. The diversity of the result set is measured to identify whether the result set is sufficiently diverse such that it provides a higher probability that the listed products accurately match the user's need. If, for example, the categories assigned to the products are not sufficiently diverse (e.g., all items assigned to "golf" category), then the search engine module may expand the search by, for example, adding additional query terms to the query 702, which is described above.

Figure 8:
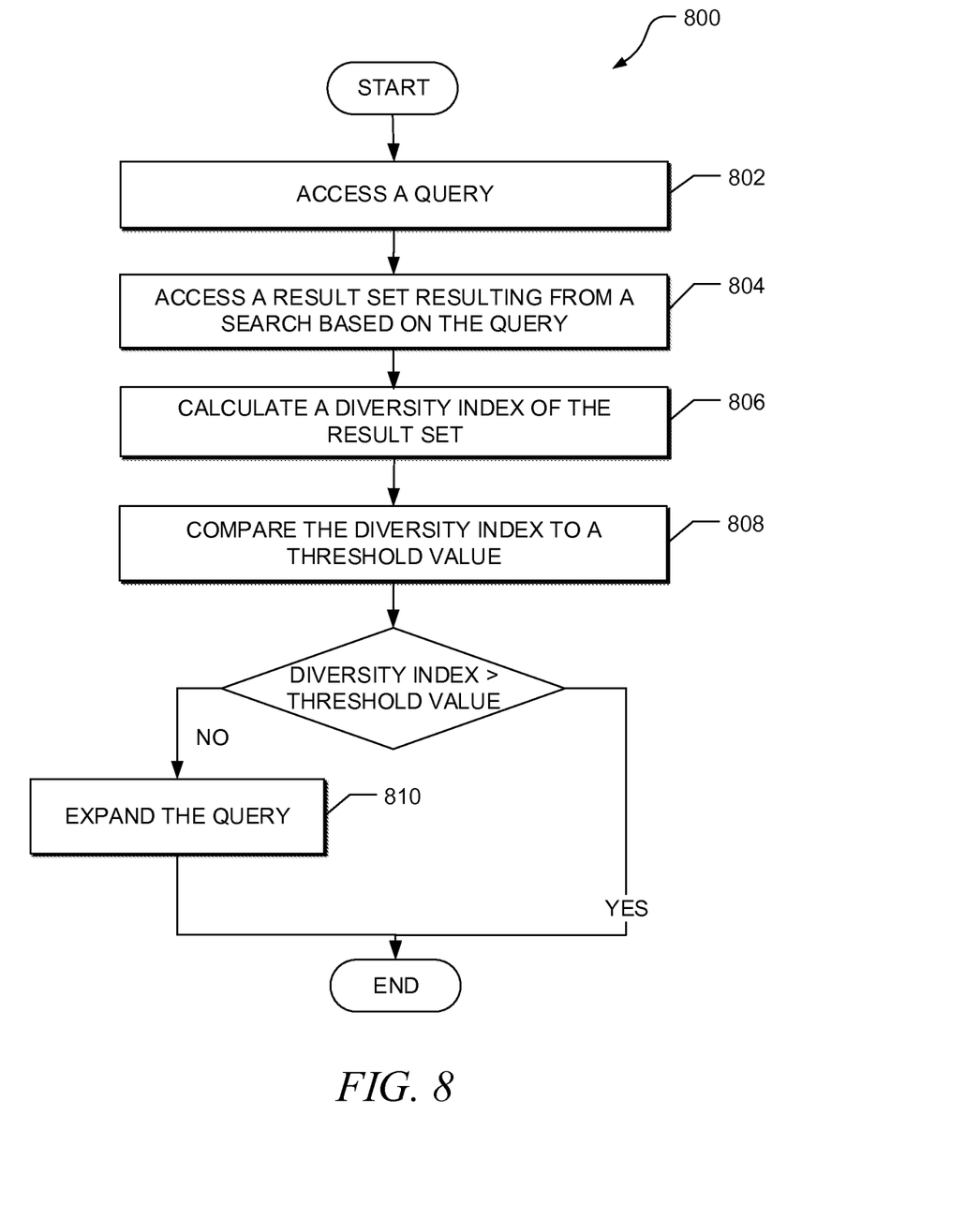
FIG. 8 depicts a flow diagram of a detailed method, in accordance with an illustrative embodiment, for expanding a search based on results from the search.

FIG. 8 depicts a flow diagram of a detailed method 800, in accordance with an illustrative embodiment, for expanding a search based on results from the search. As depicted, a query submitted by a user is accessed at 802. A search for information based on the submitted query is conducted and a result set resulting from the search is accessed at 804. A diversity index of the result set is then calculated at 806.

This calculated diversity index is compared to a threshold value at 808 and the search may be expanded at 810 based on the comparison. For example, if the diversity index exceeds the threshold value, then the result set is sufficiently diverse and the search is not expanded. On the other hand, if the diversity index is less than the same threshold value, then the search is not sufficiently diverse and is expanded.

Figure 9:
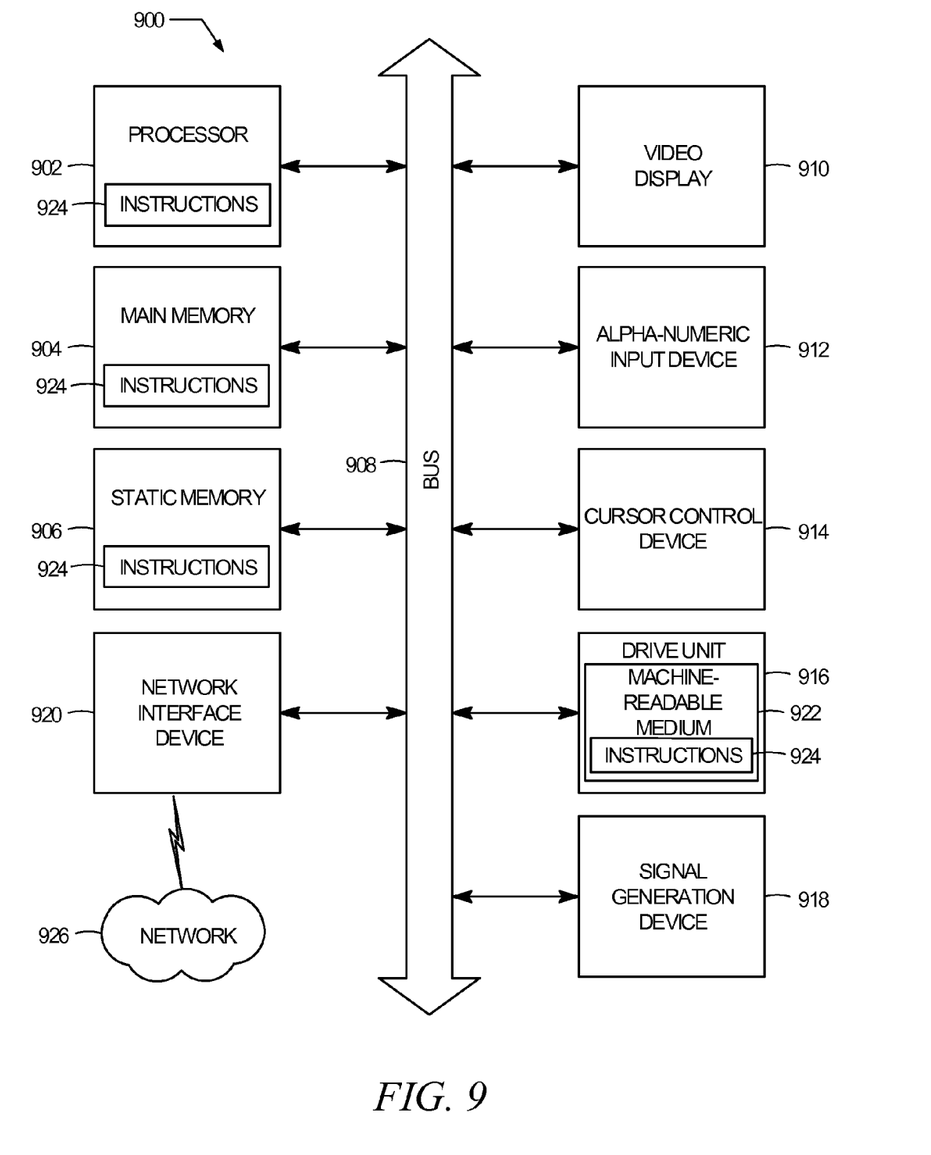
FIG. 9 depicts a block diagram of a machine in the example form of a processing system within which a set of instructions, for causing the machine to perform any one or more of the methodologies discussed herein, may be executed.

FIG. 9 is a block diagram of a machine in the example form of a processing system within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. Furthermore, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 900 includes a processor 902 (e.g., a central processing unit (CPU), a graphics processing unit (GPU) or both), a main memory 904, and static memory 906, which communicate with each other via bus 908. The processing system 900 may further include video display unit 910 (e.g., a plasma display, a liquid crystal display (LCD) or a cathode ray tube (CRT)). The processing system 900 also includes an alphanumeric input device 912 (e.g., a keyboard), a user interface (UI) navigation device 914 (e.g., a mouse), a disk drive unit 916, signal generation device 918 (e.g., a speaker), and network interface device 920.

The disk drive unit 916 includes machine-readable medium 922 on which is stored one or more sets of instructions and data structures (e.g., software 924) embodying or utilized by any one or more of the methodologies or functions described herein. The software 924 may also reside, completely or at least partially, within main memory 904 and/or within processor 902 during execution thereof by processing system 900, main memory 904, and processor 902 also constituting machine-readable, tangible media.

The software 924 may further be transmitted or received over network 926 via network interface device 920 utilizing any one of a number of well-known transfer protocols (e.g., HTTP).

While the invention(s) is (are) described with reference to various implementations and exploitations, it will be understood that these embodiments are illustrative and that the scope of the invention(s) is not limited to them. In general, techniques expanding a search based on diversity may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A system for expanding a search, the system comprising:
   a processor and executable instructions accessible on a computer-readable medium that, when executed, cause the processor to perform operations comprising:
   calculate a diversity index for a plurality of query terms included in a plurality of other queries associated with a query, the diversity index being a measure of diversity among the plurality of query terms, the diversity index relating to differences among the plurality of query terms;
   compare the diversity index to a threshold value; and
   expand the query with one or more of the plurality of query terms based on the comparison.

2. The system of claim 1, wherein the expanding the query is responsive to the diversity index being less than the threshold value.

3. The system of claim 1, wherein the diversity index is a Simpson's diversity index.

4. The system of claim 1, wherein the diversity index is a Shannon index.

5. The system of claim 1, wherein the query is used in a search for a product.

6. The system of claim 1, wherein the query is used in a search for a web page.

7. The system of claim 1, further comprising identifying the plurality of queries as submitted within a predetermined period of time.

8. The system of claim 1, further comprising receiving, over a network, the query.

9. The system of claim 1, wherein the query is utilized to generate a result set.

10. A method of expanding a search, the method comprising:
    calculating a diversity index for a plurality of query terms included in a plurality of other queries associated with a query, the diversity index being a measure of diversity among the plurality of query terms, the diversity relating to differences among the plurality of query terms;
    comparing the diversity index to a threshold value; and
    expanding the query with one or more of the plurality of query terms based on the comparison.

11. The method of claim 10, wherein the expanding the query is responsive to the diversity index being less than the threshold value.

12. The method of claim 10, wherein the diversity index is a Simpson's diversity index.

13. The method of claim 10, wherein the diversity index is a Shannon index.

14. The method of claim 10, wherein the query is used in a search for a product.

15. The method of claim 10, wherein the query is used in a search for a web page.

16. The method of claim 10, further comprising identifying the plurality of queries as submitted within a predetermined period of time.

17. The method of claim 10, further comprising receiving, over a network, the query.

18. The method of claim 10, wherein the query is utilized to generate a result set.

19. A machine-readable medium having no transitory signals and storing a set of instructions that, when executed by a processor, causes a machine to perform operations comprising:
    calculating a diversity index for a plurality of query terms included in a plurality of other queries associated with a query, the diversity index being a measure of diversity among the plurality of query terms, the diversity relating to differences among the plurality of query terms;
    comparing the diversity index to a threshold value; and
    expanding the query with one or more of the plurality of query terms based on the comparison.

20. The machine-readable medium of claim 19, wherein the expanding of the query is responsive to the diversity index being less than the threshold value.

* * * * *